United States Patent Office 3,585,242
Patented June 15, 1971

3,585,242
AROMATIC MONOALKOXYALDEHYDE ACETALS
Ernst Roos, Cologne-Flittard, and Klaus Wagner, Cologne, Buchheim, Germany, assignors to Farbenfabriken Bayer Aktiengesellschaft, Leverkusen, Germany
No Drawing. Filed Sept. 9, 1968, Ser. No. 758,584
Claims priority, application Germany, Oct. 17, 1967, F 53,800
Int. Cl. C07c 43/30
U.S. Cl. 260—613    5 Claims

ABSTRACT OF THE DISCLOSURE

Reacting halogenated benzenes containing at least two dichloromethyl groups with monohydric or polyhydric alcohols to obtain monoalkoxybenzaldehyde acetals which are useful as herbicides.

---

It is already known that pentachlorobenzal chloride can be reacted with alkali metal alcoholates to form para-alkoxytetrachlorobenzaldehyde acetals (Cf. S. D. Rose, M. Markarian, J. Am. Chem. Soc. 71 (1949) 2756). For example, it is possible by reacting sodium methoxide with pentachlorobenzal chloride to obtain para-methoxy-tetrachlorobenzaldehyde dimethyl acetal:

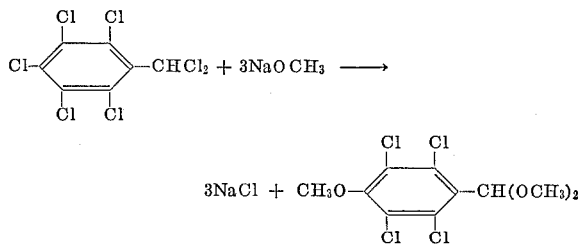

It would be logical to assume from this reaction that dialkoxy diecetals would be formed as the end products in the corresponding reactions of the tetrachloro-bis-(dichloromethyl)-benzenes with alkali metal alcoholates, and trialkoxytriacetals as the end products in the reaction of 2,4,6-trichloro-1,3,5-tris-(dichloromethyl)-benzene.

Surprisingly, it has now been found that monoalkoxy aldehyde acetals are obtained by reacting aromatic compounds which contain at least two dichloromethyl groups in the molecule and which otherwise are completely substituted by chlorine atoms, with at least the stoichiometrically necessary quantity of a monohydric or polyhydric alcohol at a temperature of from 0 to 200° C. in the presence of an alkaline condensation agent.

It was also found in the course of this work that when starting compounds having two $CHCl_2$ groups in the ortho or para position relative to one another are reacted only one of these groups is converted into the acetal, whilst the second remains unchanged, even when the alkali metal alcoholate is used in a fairly large excess.

In contrast to the already known reactions involving pentachlorobenzalchloride, which lead to the defined paraalkoxy compounds, isomer mixtures of monoalkoxyacetals are obtained in almost every instance in the reaction, according to the invention, of aromatic compounds which contain at least two dichloromethyl groups in the molecule and which otherwise are entirely substituted by chlorine atoms, with alkali metal alcoholates.

This unique reaction mechanism is illustrated by the reactions set out in the following Table A. The preparation of monoalkoxydichlorotrimesine aldehyde acetals is described in this table under IV, as an example of a reaction in which a defined monoalkoxy compound, rather than an isomer mixture is formed because of the constitution of the starting material.

TABLE A

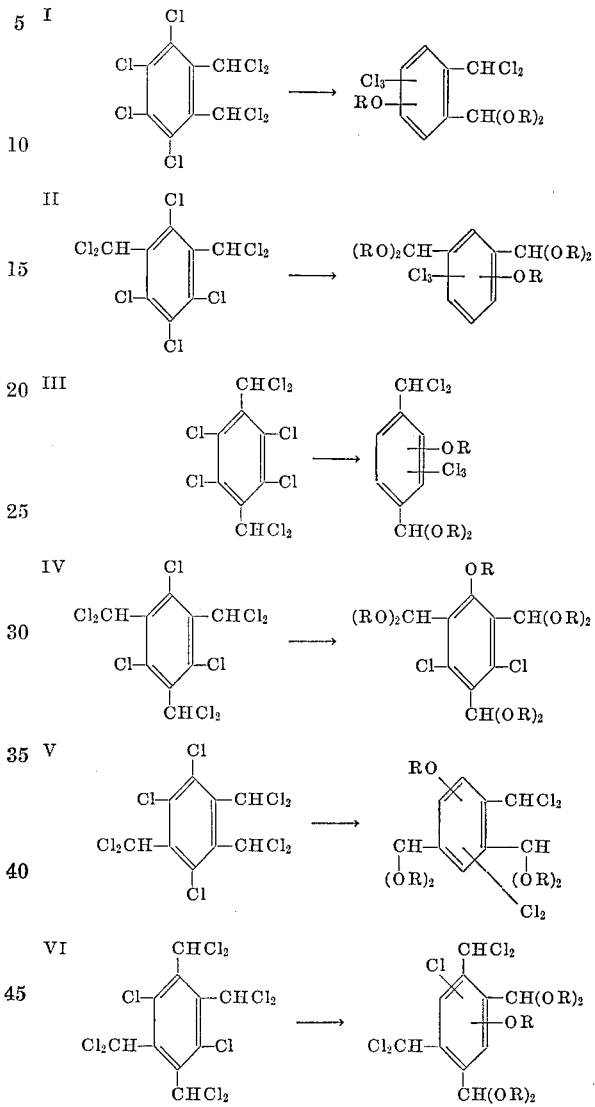

In one particular embodiment of the process according to the invention, an aromatic polyhalogen compound having the formula:

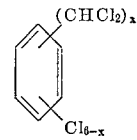

in which X represents an integer from 2 to 5, is reacted in the presence of an alkaline condensation agent with at least the stoichiometric quantity of an alkali metal alcoholate of an alcohol of the formula $$R(OH)_a$$

in which $a$ represents an integer from 1 to 6 and R represents an optionally unsaturated aliphatic hydrocarbon radical whose carbon chain may optionally be interrupted by ether oxygen atoms, or an araliphatic radical.

The chlorine compounds used as the starting materials are known from the literature and are readily prepared by the nuclear and side-chain chlorination of aromatic alkyl compounds containing at least two methyl groups on the benzene nucleus.

The following are examples of alcohols suitable for use in the process according to the invention: linear or branched, saturated or unsaturated aliphatic monohydric alcohols with from 1 to 20 carbon atoms and preferably with from 1 to 18 carbon atoms, which may optionally contain two double bonds or one triple bond, such as methanol, ethanol, butanols, amyl alcohols, octyl alcohols, lauryl alcohol, stearyl alcohol, allyl alcohol, butinols and oleyl alcohols; cycloaliphatic alcohols with from 5 to 12 (and preferaby with 5 or 6) carbon atoms in the ring, which may optionally by substituted by lower alkyl radicals, such as cyclopentanol, cyclohexanol and methyl cyclohexonal; araliphatic alcohols with from 7 to 12 carbon atoms, in which case aryl is preferably phenyl whilst the aliphatic chain has from 1 to 6 (and preferably 1 or 2) carbon atoms, such as benzyl alcohol and phenylethyl alcohol; linear or branched saturated and unsaturated dihydric and polyhydric alcohols with from 2 to 20 (and preferably from 2 to 10) carbon atoms which may optionally contain two double bonds or one triple bond, such as ethylene glycol, trimethylol ethane, trimethylol propane, hexane triols, xylylene glycols, cyclohexane diols, butene diols and butine diols.

In a preferred embodiment of the process according to the invention, polyalkylene glycols which contain terminal hydroxyl groups and whose alkylene group has from 2 to 6 carbon atoms, with up to 33 (and preferably 4 to 17) ether oxygen atoms in the chain, are used. The following are mentioned by way of example: ethylene glycol monomethyl ether, diethylene glycol, tripropylene glycol, octaethylene glycol and fairly high molecular weight polyethers with molecular weights of up to 2000 of the kind described in particular in "Kunststoffhandbuch," vol. 7, Carl Hanser Verlag, Munich, 1966, p. 60 et seq, in the chapter entitled "Polyethers."

The process according to the invention is carried out by reacting the alkali metal alcoholate or alkali metal hydroxide with a solution or suspension of the highly chlorinated alkyl-aromatic compound in the alcohol required for etherification and acetal formation, at a temperature in the range from 0 to 200° C. and preferably at a temperature of from 20 to 120° C. The alkali metal compound is used in a quantity of at least 3 mols per mol of the chlorine compound, and is preferably used in the calculated quantity or in a slight excess. The alkali metal hydroxide or alcoholate may be added either in solid form or in the form of a 5 to 70% by weight (and preferably 20 to 60% by weight) aqueous solution. In some instances, it may be of advantage initially to introduce the alkaline solution and then to add the chlorine-containing compound to it. Suitable alkaline condensation agents include, above all, sodium and potassium hydroxide and sodium methoxide. The reaction is generally carried out with external heating. In some instances, however, the reaction is so highly exothermic that additional heat need only be supplied towards the final stages of the reaction. The progress of the reaction may readily be followed by measuring the pH-value of the reaction mixture.

The quantity in which the alcohol is used corresponds at least to the calculated quantity, for example, 3, 5 or 7 mols per mol of the chlorine compound. In many instances, however, particularly where low molecular weight alcohols are used, it is of advantage to use an excess of the alcohol as solvent or diluent, so that the mixture with the solid chlorine compound can be effectively stirred. It may, however, also be of advantage to employ an excess when fairly high molecular weight alcohols or polyols are used. In some instances, for example in order to obtain reaction products of fairly low viscosity, this excess of alcohol may even be left in the reaction product and not subsequently separated.

Most of the compounds that can be obtained by the process according to the invention correspond to the formula

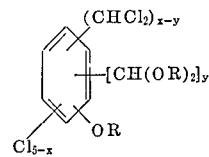

in which $x$ represents an integer from 2 to 5 and $y$ represents an integer from 1 to 3, whilst R represents the radical of an alcohol as defined above. The compounds that can be obtained by the process according to the invention are valuable intermediates for the preparation of plant-protection agents and may even be directly used as such.

The herbicidal activity of the monoalkoxy aldehyde acetals is particularly pronounced. Thus, when used in a quantity of 5 kg./ha., 4-dichloromethyl-monomethoxy-trichlorobenzaldehyde dimethyl acetal, obtained in accordance with Example 3, has a marked pre-emergence herbicidal effect on millet, whilst in the same test oats, cotton, wheat and mustard remain unaffected, and the same is true even when the compound is used in twice the quantity. The other monoalkoxy aldehyde acetals with low molecular weight alcohol radicals also show similar herbicidal activity.

It is possible, by hydrolysing the acetal groups in the compounds according to the invention, to provide alkoxy aldehydes that are otherwise difficult to prepare, some of which show different biological effects. Thus, monomethoxydichlorotrimesine aldehyde, melting at 123° C., obtained by hydrolysing the tris-acetal described in Example 4 with dilute sulphuric acid, has a fungicidal effect, in particular on the mycellium growth of *Piricularia oryzae*, *Cercospora musae* and *Verticilium albo-atrum*.

The process according to the invention is illustrated by the following examples. The Roman numerals refer to the corresponding reaction equation as set out in Table A above.

Example 1 (according to I)

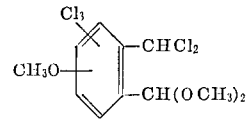

762 g. (2 mols) of tetrachloro-1,2-bis-(dichloromethyl)-benzene were added in portions at 50 to 70° C. to a solution of 320 g. (8 mols) of sodium hydroxide in 3500 ml. of methanol. The reaction mixture was heated at a boiling point over a period of 10 hours and suction filtered from the sodium chloride that was precipitated. The excess methanol was evaporated from the filtrate and the residual oil was taken up in methylene chloride. The methylene chloride solution was washed thoroughly with water and dried over potassium carbonate, and the excess methylene chloride was removed by distillation. Distillation of the residue in a high vacuum gave the acetal mixture in the form of a pale yellow oil.

Yield: 593 g. (80% of the theoretical), B.P.=186° C. (0.2 torr), $n_D^{20}$=1.6583.

$C_{11}H_{11}Cl_5O_3$ (368.5): Calculated (percent): C, 35.8; H, 3.1; Cl, 48.1; O, 13.0. Found (percent): C, 36.2; H, 3.2; Cl, 47.9; O, 13.1.

The same product was obtained by using potassium hydroxide instead of sodium hydroxide.

Example 2 (according to II)

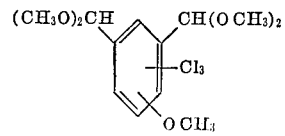

381 g. (1 mol) of tetrachloro-1,3-bis-(dichloromethyl)-benzene were added in portions while stirring to a solution heated to approximately 60° C. of 230 g. (5 mols+15% excess) of NaOH in 2000 cc. of methanol. After the exothermic reaction had subsided, the reaction mixture was heated at boiling point over a period of 10 hours and suction filtered from the sodium chloride; most of the methanol was removed from the filtrate in vacuo, after which the filtrate was taken up in methylene chloride and washed with water. The methylene chloride solution dried over potash had excess solvent removed from it and the residue was distilled in vacuo.

The acetal mixture was obtained in the form of a pale yellow oil.

Yield: 303 g. (84% of the theoretical), B.P.=148–150° C. (0.1 torr), $n_D^{20}$=1.5377.

$C_{13}H_{17}Cl_3O_5$ (359.6): Calculated (percent): C, 43.42; H, 4.76; Cl, 29.58. Found (percent): C, 43.45; H, 4.88; Cl, 29.90.

Example 3 (according to III)

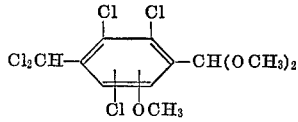

382 g. (1 mol) of 1,4-bis-(dichloromethyl)-2,3,5,6-tetrachlorobenzene were introduced at 50–60° C. into a solution of 69 g. (3 gram-atoms) of sodium in 1 litre of methanol. The mixture was boiled under reflux for 7.5 hours and diluted with 1 litre of water. The oil which separated was taken up in methylene chloride, which was dried over sodium sulphate, and evaporated at a temperature of up to 100° C. in a water-jet vacuum (15 mm. Hg). The oily residue was distilled in a high vacuum.

Yield: 336 g. (91% of the theoretical) of an almost colourless oil, B.P. 0.08=151° C., $n_D^{20}$=1.5780.

$C_{11}H_{11}Cl_5O_3$ (368.5): Calculated (percent): C, 35.82; H, 2.99; Cl, 48.17; O, 13.03. Found (percent): C, 36.3; H, 3.1; Cl, 47.7; O, 13.2.

When ethyl alcohol was used instead of methanol, a yellow oil of B.P.$_{0.15}$=155–165° C., $n_D^{20}$=1.5600 was obtained, whilst an orange-coloured oil of B.P.$_{0.07}$=188–200° C., $n_D^{20}$=1.5197 was obtained when n-butanol was used. All three products were found by thin-layer chromatography to be isomer mixtures.

Example 4 (according to IV)

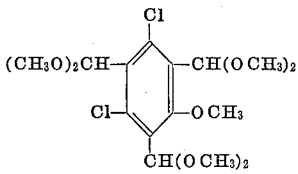

216 g. (0.5 mol) of 1,3,5-tris-(dichloromethyl)-2,4,6-trichlorobenzene were introduced with cooling at 20–50° C. into a solution of 140 g. (3.5 mols) of sodium hydroxide in 1 litre of methanol. After the exothermic reaction was over, the mixture was boiled for 3 hours, and 1 litre of water was added to it. The crystals which precipitated were suction filtered and recrystallised from light petrol.

Yield: 146 g. (73% of the theoretical) of colourless crystals melting at 96–97° C.

$C_{16}H_{24}Cl_2O_7$ (399): Calculated (percent): C, 48.12; H, 6.02; Cl, 17.90; O, 28.7. Found (percent): C, 47.7; H, 6.0; Cl, 18.2; O, 28.9.

Example 5 (according to V)

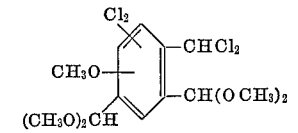

A solution of 115 g. (2.5 mols+15% excess) of sodium hydroxide in 1000 ml. of methanol was reacted at 50–70° C. with 215 g. (0.5 mol) of trichloro-1,2,4-tris-(dichloromethyl)benzene. To complete the reaction, the reaction mixture was heated for another 10 hours until it boiled. After working up (as in Example 1), the acetal mixture was obtained in the form of a light yellow oil.

Yield: 150 g. (73.5% of the theoretical), B.P.=173–175° C. (0.1 torr), $n_D^{20}$=1.5460.

$C_{14}H_{18}Cl_4O_5$ (408.1): Calculated (percent): C, 41.2; H, 4.4; Cl, 34.8; O, 19.6. Found (percent): C, 41.5; H, 4.1; Cl, 35.5; O, 18.9.

Example 6 (according to VI)

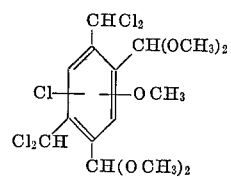

191.6 g. (0.4 mol) of 1,3,4,5-tetra-(dichloromethyl)-3,6-dichlorobenzene was added to a solution of 46 g. (2 gram atoms) of sodium in 1000 ml. of methanol. The mixture was boiled under reflux for 24 hours and then diluted with 1000 ml. of water. The oil which separated was dissolved in methylene chloride, and the resulting solution dried over sodium sulphate. The solvent was then evaporated at a temperature of up to 100° C. in a water-jet vacuum. A viscous oil was left as the residue from which colourless crystals melting at 200–205° C. precipitated on prolonged standing.

Yield: 152 g. (83.4% of the theoretical).

$C_{15}H_{19}Cl_5O_5$ (456.5): Calculated (percent): C, 39.43; H, 4.16; Cl, 38.88; O, 17.53. Found (percent): C, 39.6; H, 4.5; Cl, 38.9; O, 17.1.

Example 7 (according to III)

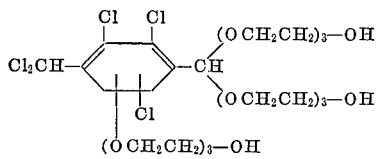

900 g. (6 mols) of triethylene glycol and 382 g. (1 mol) of 1,4-bis-(dichloromethyl)-2,3,5,6-tetrachlorobenzene were heated to 80° C. and 266 g. (3 mols) of 45% by weight aqueous sodium hydroxide were added at 80–100° C. The mixture was stirred for 4 hours at 90–100° C., after which it had a pH value of 7. After dilution with 1000 ml. of water, the oil which separated was taken up in methylene chloride. The solution was dried over $Na_2SO_4$ and the solvent was evaporated at a temperature up to 100° C. in a water-jet vacuum.

Yield: 666 g. (92.2% of the theoretical) of a brown oil.

$C_{26}H_{41}O_{12}Cl_5$ (723): Calculated (percent): Cl, 24.6; OH-number 232. Found (percent): Cl, 26.9; OH-number 217.

A product of similar composition was obtained by using tripropylene glycol instead of triethylene glycol.

Example 8 (according to III)

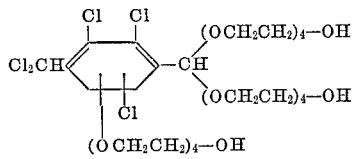

266 g. (3 mols) of 45% by weight aqueous sodium hydroxide were added at 70–100° C. to 582 g. (3 mols) of tetraethylene glycol and 382 g. (1 mol) of 1,4-bis-dichloromethyl)-2,3,5,6-tetrachlorobenzene. The mixture was stirred for 8 hours at 90–100° C., the solvent was distilled off at a temperature of 100° C. in a water-jet vacuum and the residue was suction filtered to separate sodium chloride.

Yield: 775 g. (91% of the theoretical) of a brown oil.

$C_{32}H_{33}Cl_5O_{15}$ (854.5): Calculated (percent): Cl, 28.8; OH-number 192. Found (percent): Cl, 19.9; OH-number 196.

Similar reaction products were obtained by using mono-di- or octa-ethylene glycol instead of tetra-ethylene glycol.

Example 9 (according to III)

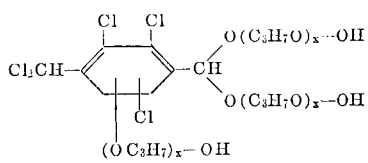

$x=16-17$ (calc. 16.4).

133 g. (1.5 mol) of 45% by weight aqueous sodium hydroxide were added at 70–100° C. to 1500 g. (1.5 mol) of polypropylene glycol of molecular weight 1000 (OH-number 112) and 191 g. (0.5 mol) of 1,4-bis-(dichloromethyl)-2,3,5,6-tetrachlorobenzene. The mixture was stirred for 10 hours at 100° C., the solvent was distilled off in a water-jet vacuum at 100° C. and the residue was suction filtered to separate sodium chloride.

Yield: 1500 g. (96% of the theoretical) of a light brown oil, molecular weight 3287.

Calculated (percent): Cl, 5.4; OH-number 51. Found (percent): Cl, 5.9; OH-number 58.

A similar product with a lower OH-number and a lower chlorine content was obtained by using a polypropylene glycol of molecular weight 2000 (OH-number 56).

Example 10 (according to I–III)

Reaction product of octachloro-xylene (mixture of o-, m-, p-isomers) and tetraethylene glycol:

667 g. (7.5 mols) of 45% by weight aqueous sodium hydroxide were added at 90–100° C. to 1940 g. (10 mols) of tetra-ethylene glycol and 955 g. (2.5 mols) of octa-chloro-xylene which was obtained by the nuclear and side-chain-chlorination of commercial xylene and which contained a mixture of o-, m- and p-octa-chloro xylenes (Cf. Table A, I to III). The mixture was stirred for 5 hours at 100° C., the solvent was distilled off at a temperature up to 100° C. in a water-jet vacuum and the residue was suction filtered to separate sodium chloride. 2259 g. of a brown oil with an OH-number of 307 and a chlorine content of 16.7% were obtained. The excess of tetra-ethylene glycol was not removed, but was used to lower the viscosity and to increase the OH-number of the reaction product.

We claim:
1. Aromatic monoalkoxyaldehyde acetals selected from the group consisting of

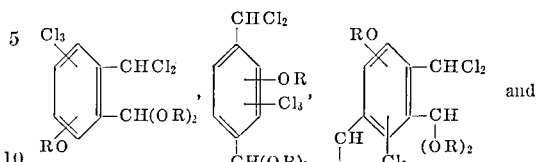

and

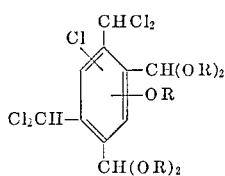

wherein R is lower alkyl.

2. A compound according to claim 1, wherein such compound has the formula

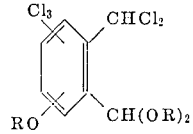

3. A compound according to claim 1, wherein such compound has the formula

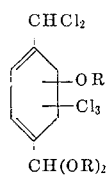

4. A compound according to claim 1, wherein such compound has the formula

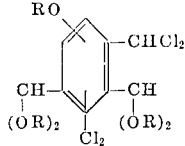

5. A compound according to claim 1, wherein such compound has the formula

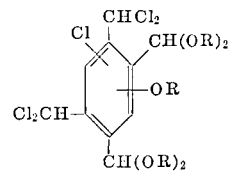

References Cited

Ross et al.: JACS 71 (1949), 2756–2758.

BERNARD HELFIN, Primary Examiner

U.S. Cl. X.R.

71—124; 260—999

UNITED STATES PATENT OFFICE
CERTIFICATE OF CORRECTION

Patent No. 3585242      Dated June 15, 1971

Inventor(s) Ernst Roos and Klaus Wagner

It is certified that error appears in the above-identified patent and that said Letters Patent are hereby corrected as shown below:

Col. 1, line 23 (spec. p. 1, line 5)

"S. D. Rose" should be -- S. D. Ross -- line 40 (spec. p. 2, line 12)

"diecetals" should be -- diacetals --

Col. 6, line 45 (spec. p. 11, line 21)

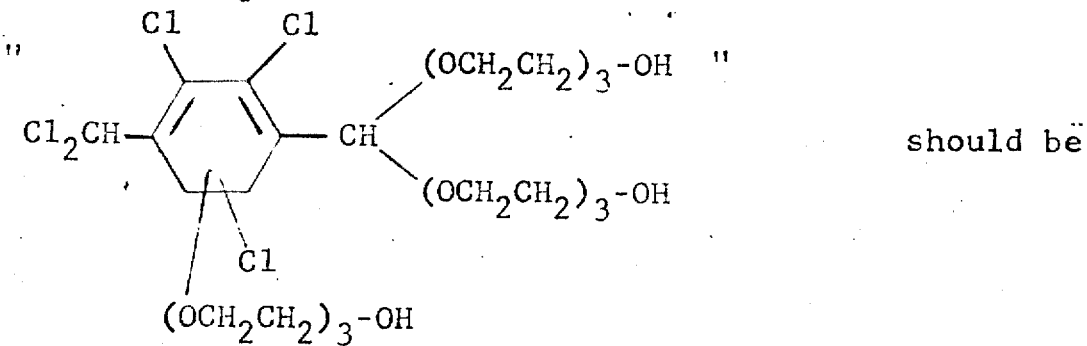

should be

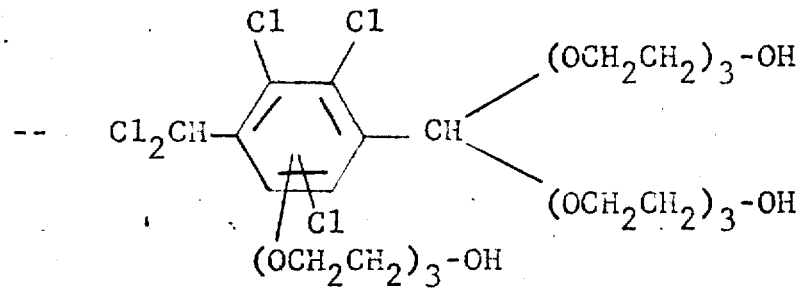

UNITED STATES PATENT OFFICE
CERTIFICATE OF CORRECTION

Patent No. 3585242    Dated June 15, 1971

Inventor(s) Ernst Roos and Klaus Wagner    PAGE - 2

It is certified that error appears in the above-identified patent and that said Letters Patent are hereby corrected as shown below:

Col. 6, line 70 (spec. p. 12, line 15)

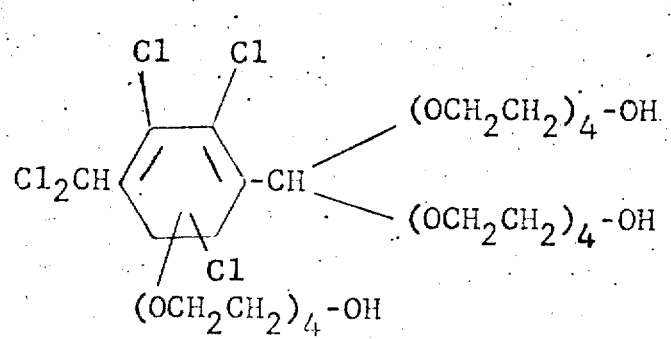

should be

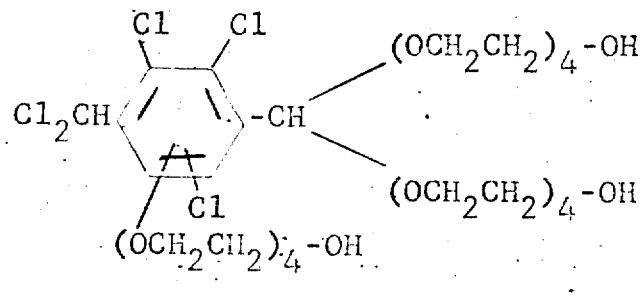

Col. 7, line 9 (spec. p. 12, line 25)

"Cl, 28.8" should be -- Cl, 20.8 --.

UNITED STATES PATENT OFFICE
CERTIFICATE OF CORRECTION

Patent No. 3585242                    Dated June 15, 1971

Inventor(s) Ernst Roos and Klaus Wagner            PAGE - 3

It is certified that error appears in the above-identified patent and that said Letters Patent are hereby corrected as shown below:

Col. 7, line 22 (spec. p. 13, line 3)

"
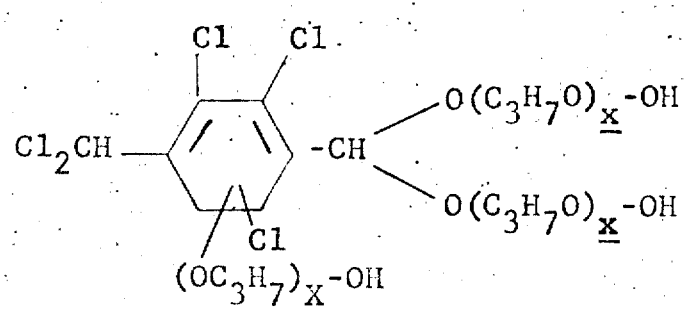

$\underline{x}$ = 16-17 (calc. 16.4)
"

should be

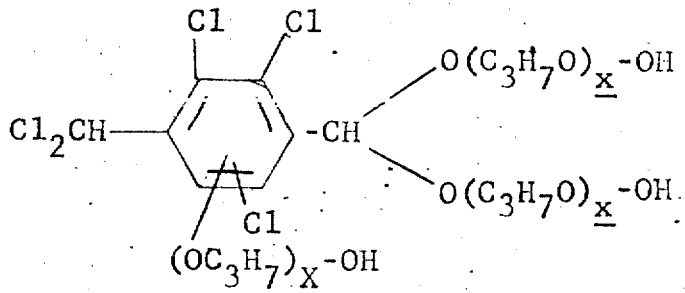

$\underline{x}$ = 16-17 (calc. 16.4)

Signed and sealed this 11th day of January 1972.

(SEAL)
Attest:

EDWARD M. FLETCHER, JR.          ROBERT GOTTSCHALK
Attesting Officer                Acting Commissioner of Patents